(12) United States Patent
Yerby, Jr.

(10) Patent No.: US 12,522,061 B2
(45) Date of Patent: Jan. 13, 2026

(54) INFLATABLE VEHICLE COVER

(71) Applicant: Patrick Timothy Yerby, Jr., Lynchburg, VA (US)

(72) Inventor: Patrick Timothy Yerby, Jr., Lynchburg, VA (US)

( * ) Notice: Subject to any disclaimer, the term of this patent is extended or adjusted under 35 U.S.C. 154(b) by 105 days.

(21) Appl. No.: 18/217,240

(22) Filed: Jun. 30, 2023

(65) Prior Publication Data

US 2024/0001747 A1 Jan. 4, 2024

Related U.S. Application Data (60) Provisional application No. 63/357,160, filed on Jun. 30, 2022.

(51) Int. Cl.
*B60J 11/04* (2006.01)

(52) U.S. Cl.
CPC ................................ *B60J 11/04* (2013.01)

(58) Field of Classification Search
CPC ........................................................ B60J 11/04
USPC ........................................................ 150/166
See application file for complete search history.

(56) References Cited

U.S. PATENT DOCUMENTS

| | | |
|---|---|---|
| 3,343,556 A | 9/1967 | Stamberger |
| 3,474,803 A | 10/1969 | Davis |
| 4,044,867 A | 8/1977 | Fisher |
| 4,084,358 A * | 4/1978 | Winters ............... E04H 7/30 52/63 |
| 4,209,197 A | 6/1980 | Fischer |
| 4,294,483 A | 10/1981 | Ferris |
| 4,315,535 A | 2/1982 | Battle |
| 4,384,602 A | 5/1983 | Ores |
| 4,432,581 A | 2/1984 | Guma |
| 4,699,192 A | 10/1987 | Kamen |
| 4,773,456 A | 9/1988 | Rodgers |
| 4,826,329 A | 5/1989 | Bellini |
| 4,858,985 A | 8/1989 | Wojcik |
| 4,889,171 A | 12/1989 | Minimo |
| 4,973,100 A * | 11/1990 | Yang ................... B60J 11/00 296/136.04 |
| 4,991,363 A | 2/1991 | Randmae |
| 5,241,977 A | 9/1993 | Flores |
| 5,242,206 A | 9/1993 | Heck |

(Continued)

FOREIGN PATENT DOCUMENTS

| | | |
|---|---|---|
| AT | 725 U1 | 4/1996 |
| AT | 6147 U1 | 5/2003 |

(Continued)

*Primary Examiner* — Nathan J Jenness
*Assistant Examiner* — Jessica Kavini Tamil
(74) *Attorney, Agent, or Firm* — Nixon Peabody LLP (57) ABSTRACT

A vehicle cover includes a top structure, one or more sidewalls, and a valve. The top structure is configured to be positioned above a top of a vehicle. Each of the one or more sidewalls is configured to be positioned adjacent to a side of the vehicle and is configured to hold the top structure above the top of the vehicle. The valve is positioned adjacent to the top structure or one of the one or more sidewalls. The top structure and the one or more sidewalls define an interior space that is sized to receive the vehicle. The top structure and the one or more sidewalls are each formed from a plurality of inflatable tubes, where each of the inflatable tubes is fluidly coupled to the valve.

20 Claims, 5 Drawing Sheets

(56) References Cited

U.S. PATENT DOCUMENTS

| | | | |
|---|---|---|---|
| 5,252,209 A | 10/1993 | Retter | |
| 5,275,460 A | 1/1994 | Kraus | |
| 5,287,904 A | 2/1994 | Smith | |
| 5,350,000 A | 9/1994 | Wang | |
| 5,351,829 A | 10/1994 | Batsford | |
| 5,364,156 A | 11/1994 | Zerow | |
| 5,401,074 A | 3/1995 | Timerman | |
| 5,497,819 A | 3/1996 | Chiang | |
| 5,516,181 A | 5/1996 | Thompson | |
| 5,518,289 A | 5/1996 | Cobble | |
| 5,566,512 A | 10/1996 | Page | |
| 5,660,134 A | 8/1997 | Kim | |
| 5,664,825 A | 9/1997 | Henke | |
| 5,673,961 A | 10/1997 | Mazzarelli | |
| 5,738,403 A | 4/1998 | Tyson | |
| 5,800,006 A | 9/1998 | Pettigrew | |
| 5,816,310 A | 10/1998 | Wu | |
| D402,622 S | 12/1998 | Rogers | |
| 5,890,525 A | 4/1999 | Shores | |
| 5,902,003 A | 5/1999 | Hindson | |
| 5,921,389 A | 7/1999 | Zoffer | |
| 5,954,200 A | 9/1999 | Allain | |
| 6,044,881 A * | 4/2000 | Welch | B60J 11/04 206/582 |
| 6,056,347 A | 5/2000 | D Adamo | |
| 6,070,629 A | 6/2000 | D Adamo | |
| 6,203,095 B1 | 3/2001 | Peterson | |
| 6,220,263 B1 | 4/2001 | Randmae | |
| 6,220,648 B1 | 4/2001 | Daniel | |
| 6,273,113 B1 | 8/2001 | Streyckmans | |
| 6,318,426 B1 | 11/2001 | Thomas | |
| 6,363,661 B1 | 4/2002 | Myers | |
| 6,371,547 B1 | 4/2002 | Halbrook | |
| 6,412,851 B1 | 7/2002 | Burks | |
| 6,415,832 B1 | 7/2002 | Ricks | |
| 6,439,644 B1 | 8/2002 | Jester | |
| 6,485,083 B1 | 11/2002 | Giannias | |
| 6,513,858 B1 | 2/2003 | Li | |
| 6,517,141 B1 | 2/2003 | Su | |
| 6,578,900 B1 | 6/2003 | Riportella | |
| 6,588,827 B2 | 7/2003 | Heiland | |
| 6,591,941 B1 | 7/2003 | Mannie | |
| 6,705,664 B1 | 3/2004 | Lahutsky | |
| 6,837,532 B1 | 1/2005 | Hicks | |
| 6,893,074 B1 | 5/2005 | Wilson | |
| 6,962,284 B1 | 11/2005 | Hartelius | |
| 7,100,965 B1 | 9/2006 | Stover | |
| 7,182,391 B2 | 2/2007 | Thrasher | |
| 7,360,820 B2 | 4/2008 | Tellez | |
| 7,381,460 B2 | 6/2008 | Palmer | |
| 7,604,016 B2 | 10/2009 | Songest | |
| 7,699,380 B2 | 4/2010 | Coleman | |
| 7,963,581 B1 | 6/2011 | Miller | |
| 8,091,947 B1 | 1/2012 | Miller | |
| 8,146,984 B2 | 4/2012 | Devereaux | |
| 8,171,947 B2 | 5/2012 | Hardie | |
| 8,176,832 B1 | 5/2012 | Rose | |
| 8,733,380 B1 | 5/2014 | Roberts | |
| 8,757,240 B1 | 6/2014 | Song | |
| 8,857,905 B1 | 10/2014 | Pusateri | |
| 8,910,998 B1 | 12/2014 | Devathi | |
| 9,061,808 B2 | 6/2015 | Echauz | |
| 9,156,339 B1 | 10/2015 | Perez | |
| 9,248,730 B2 | 2/2016 | Hu | |
| 9,302,572 B2 | 4/2016 | Wang | |
| 9,499,035 B1 | 11/2016 | Chashchukhin | |
| 9,744,837 B2 | 8/2017 | White | |
| 9,821,644 B1 | 11/2017 | Whitfield | |
| 10,035,412 B2 | 7/2018 | Garnick | |
| 10,046,626 B2 | 8/2018 | Maclean | |
| 10,123,640 B2 | 11/2018 | Elze | |
| 10,314,760 B1 | 6/2019 | Bodman | |
| 10,358,021 B2 | 7/2019 | Martinez | |
| 10,421,563 B2 | 9/2019 | Davies | |
| D863,196 S | 10/2019 | Ariay | |
| 10,500,935 B2 | 12/2019 | Garnick | |
| 10,766,345 B2 | 9/2020 | Ching | |
| 10,800,240 B2 | 10/2020 | Cassell | |
| 10,801,228 B1 | 10/2020 | Dallas | |
| D911,252 S | 2/2021 | Muratovic | |
| 2002/0145306 A1 | 10/2002 | Mcgrath | |
| 2002/0157696 A1 | 10/2002 | O'Brien | |
| 2003/0146641 A1 | 8/2003 | Ruiz | |
| 2004/0017072 A1 | 1/2004 | Whitworth | |
| 2004/0178657 A1 | 9/2004 | Tellez | |
| 2004/0238089 A1 | 12/2004 | Li | |
| 2005/0006271 A1 | 1/2005 | Nakagawa | |
| 2005/0093332 A1 | 5/2005 | Thrasher | |
| 2005/0139300 A1 | 6/2005 | Harmon | |
| 2005/0151391 A1 | 7/2005 | Bryd | |
| 2005/0179283 A1 | 8/2005 | Lin | |
| 2005/0246964 A1 | 11/2005 | Graham | |
| 2005/0264026 A1 | 12/2005 | Badamo | |
| 2006/0043761 A1 | 3/2006 | Harcourt | |
| 2006/0061132 A1 | 3/2006 | Sua-An | |
| 2006/0103165 A1 * | 5/2006 | Ward | B60J 11/00 296/136.02 |
| 2006/0214466 A1 | 9/2006 | Davis | |
| 2006/0225822 A1 | 10/2006 | Chen | |
| 2007/0107762 A1 | 5/2007 | Graham | |
| 2007/0138829 A1 | 6/2007 | Leyendecker | |
| 2007/0166101 A1 | 7/2007 | Scheu | |
| 2007/0176462 A1 | 8/2007 | Lombardo | |
| 2007/0194598 A1 | 8/2007 | Perniciaro | |
| 2007/0216193 A1 | 9/2007 | Webber | |
| 2007/0252406 A1 | 11/2007 | Webber | |
| 2007/0267545 A1 | 11/2007 | Orr | |
| 2007/0284023 A1 | 12/2007 | Sitarz | |
| 2008/0110538 A1 | 5/2008 | Varonos | |
| 2009/0008958 A1 | 1/2009 | Sebera | |
| 2009/0108624 A1 | 4/2009 | Hunt | |
| 2009/0140541 A1 | 6/2009 | Suh | |
| 2009/0260300 A1 | 10/2009 | Orr | |
| 2010/0199610 A1 | 8/2010 | Komatsu | |
| 2010/0326017 A1 | 12/2010 | Kindel | |
| 2011/0140478 A1 | 6/2011 | Devereaux | |
| 2011/0156436 A1 | 6/2011 | Eggeman-Steffen | |
| 2011/0192511 A1 | 8/2011 | Marrone | |
| 2012/0102650 A1 | 5/2012 | Mcglynn | |
| 2012/0285588 A1 * | 11/2012 | Sheppard | B60J 11/04 150/166 |
| 2012/0318416 A1 | 12/2012 | Siciliano | |
| 2013/0026781 A1 | 1/2013 | Hobson | |
| 2013/0118659 A1 | 5/2013 | Zhou | |
| 2013/0312882 A1 | 11/2013 | Echauz | |
| 2014/0015274 A1 | 1/2014 | Banda | |
| 2014/0042771 A1 | 2/2014 | Lo | |
| 2014/0116077 A1 | 5/2014 | Pierce | |
| 2014/0265421 A1 | 9/2014 | Chang | |
| 2014/0312647 A1 | 10/2014 | Wang | |
| 2015/0075685 A1 | 3/2015 | Denham | |
| 2015/0151623 A1 | 6/2015 | Li | |
| 2015/0367717 A1 | 12/2015 | Hu | |
| 2016/0009167 A1 | 1/2016 | Ein | |
| 2016/0023543 A1 | 1/2016 | Rutland | |
| 2016/0036835 A1 | 2/2016 | Lietz | |
| 2016/0082820 A1 | 3/2016 | Stelzer | |
| 2016/0185200 A1 * | 6/2016 | Molina | B60J 11/04 296/136.02 |
| 2016/0193905 A1 | 7/2016 | Joseph | |
| 2016/0207385 A1 | 7/2016 | Ward | |
| 2016/0221427 A1 | 8/2016 | Robinson | |
| 2016/0339772 A1 | 11/2016 | Acosta | |
| 2016/0368357 A1 | 12/2016 | Lerner | |
| 2017/0326958 A1 | 11/2017 | Whitfield | |
| 2017/0341497 A1 | 11/2017 | Garnick | |
| 2018/0001755 A1 | 1/2018 | Cummings | |
| 2018/0111466 A1 | 4/2018 | Ching | |
| 2018/0127043 A1 | 5/2018 | Edwards | |

(56) References Cited

U.S. PATENT DOCUMENTS

| | | | |
|---|---|---|---|
| 2018/0160484 A1 | 6/2018 | Bryant | |
| 2023/0223896 A1* | 7/2023 | Skinner | H02S 30/20 136/245 |

FOREIGN PATENT DOCUMENTS

| | | | | | |
|---|---|---|---|---|---|
| AT | 500809 | A1 | 3/2006 | | |
| CN | 201484158 | U | 5/2010 | | |
| CN | 202138206 | U | 2/2012 | | |
| CN | 107458199 | A | 12/2017 | | |
| CN | 107458200 | A | 12/2017 | | |
| CN | 107650637 | A | 2/2018 | | |
| DE | 2000861 | A1 | 7/1971 | | |
| DE | 2504948 | A1 | 8/1976 | | |
| DE | 3928695 | A1 | 3/1991 | | |
| DE | 4400392 | A1 | 6/1994 | | |
| DE | 4316504 | A1 | 11/1994 | | |
| DE | 10110016 | A1 * | 9/2002 | | B60J 11/00 |
| DE | 10333720 | A1 | 3/2005 | | |
| DE | 102012019676 | A1 | 4/2014 | | |
| DE | 102018125753 | A1 | 4/2020 | | |
| EP | 1002681 | A2 | 5/2000 | | |
| EP | 1308334 | A1 * | 5/2003 | | B60J 11/00 |
| EP | 1632377 | A2 | 3/2006 | | |
| EP | 1878601 | A1 | 1/2008 | | |
| EP | 3309328 | A1 | 4/2018 | | |
| EP | 3501866 | A1 | 6/2019 | | |
| FR | 1588680 | A | 4/1970 | | |
| FR | 2524398 | A1 | 10/1983 | | |
| FR | 2993211 | A1 | 1/2014 | | |
| GB | 2167719 | A | 6/1986 | | |
| GB | 2347914 | A | 9/2000 | | |
| GB | 2410262 | A * | 7/2005 | | E04H 15/006 |
| GB | 2498217 | A * | 7/2013 | | B60J 11/04 |
| IT | 20080085 | A1 | 6/2010 | | |
| IT | 20090996 | A1 | 6/2011 | | |
| JP | S58101822 | A | 6/1983 | | |
| RU | 2016111003 | A | 9/2017 | | |
| SU | 893600 | A1 | 9/1973 | | |
| WO | 2004041530 | A1 | 9/1973 | | |
| WO | 0123204 | A1 | 4/2001 | | |
| WO | 2005032886 | A2 | 4/2005 | | |
| WO | 2005047038 | A1 | 5/2005 | | |
| WO | 2007046988 | A2 | 4/2007 | | |
| WO | 2014053623 | A2 | 4/2014 | | |
| WO | 2015121694 | A1 | 8/2015 | | |
| WO | 2018046782 | A1 | 3/2018 | | |
| WO | 2019165125 | A1 | 8/2019 | | |
| WO | 2019213410 | A1 | 11/2019 | | |

* cited by examiner

INFLATABLE VEHICLE COVER

CROSS-REFERENCE TO RELATED APPLICATION

This application claims priority to and benefit of U.S. Provisional Patent Application No. 63/357,160 filed Jun. 30, 2022, which is hereby incorporated by reference herein in its entirety.

TECHNICAL FIELD

The present disclosure relates vehicle covers, and more particularly, to an inflatable vehicle cover into which the vehicle can be driven for storage and protection.

BACKGROUND

Vehicle/car covers are generally used to protect automotive vehicle surfaces from damage due to a number of sources. In an outdoor environment it is desirable to protect a vehicle from impact damage due to environmental sources such as hail stone impacts or falling tree limbs for example. Protecting paint from acid rain, water spotting due to rain or condensate, tree sap deposits and other non-impact environmental hazards is also desired.

Historically, vehicle covers used to protect a vehicle's painted finish from rain and dirt in the atmosphere are typically some form of cloth covering sized to fit the vehicle relatively closely. Creating contact between the cover and the vehicle surface. More recently, inflatable car covers have been designed to protect both the vehicle's paint and the physical surface of the vehicle from more severe damage, such as hail damage or other external impact damage. The inflated structure creates a buffer between the vehicle surface and the exterior surface of the cover to absorb and push away any external impacting items. Some of these inflatable covers are large single chamber covers where the vehicle is completely inside the inflated cell, while others have multiple inflatable cells which are placed on the surface of the vehicle creating an inflated space between the vehicle and the external environment. Many of these inflatable covers require a means for controlling airflow into and out of the cover for inflation and deflation, typically some form of valve to enable the user to allow airflow into the structure when desired, retain the air in the structure once inflated, and release the air to deflate the structure when needed. Inflatable covers also typically have a means for attaching the cover to the vehicle, straps, magnets, and other structural attachment elements have been used in the prior art. The structural material of most of these inflatable vehicle covers is some form of water impermeable polymer. One of the characteristics of this material is that it does not allow water vapor to escape through the material, potentially causing issues with trapping moisture between the surface of the vehicle and the cover, which can damage the painted surface of the vehicle over time.

Additionally, many of these inflatable vehicle covers generally do not provide a method of removing the vehicle from the cover without deflating the cover, thereby decreasing convenience of use. Further, inflatable vehicle covers known in the art utilizes the vehicle body to support the cover, thereby introducing the possibility of environmental contaminants trapped between the cover and the vehicle damaging the vehicle painted surface. Additionally, the contact of the cover and the vehicle surface may trap environmental moisture on the surface of the vehicle, causing damage. Further, inflatable vehicle covers known in the art generally do not provide access inside the covered vehicle once the cover is applied. Also, inflatable vehicle covers known in the art do not provide moisture vents or ventilation fans built into the cover to expel moisture. Finally, inflatable vehicle covers known in the art do not provide a means to prevent the cover from touching the ground while also not touching the car.

SUMMARY

The term embodiment and like terms, e.g., implementation, configuration, aspect, example, and option, are intended to refer broadly to all the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate portions of the entire specification of this disclosure, any or all drawings, and each claim.

According to some aspects of the present disclosure, a vehicle cover includes a top structure, one or more sidewalls, and a valve. The top structure is configured to be positioned above a top of a vehicle. Each of the one or more sidewalls is configured to be positioned adjacent to a side of the vehicle and is configured to hold the top structure above the top of the vehicle. The valve is positioned adjacent to the top structure or one of the one or more sidewalls. The top structure and the one or more sidewalls define an interior space that is sized to receive the vehicle. The top structure and the one or more sidewalls are each formed from a plurality of inflatable tubes, where each of the inflatable tubes is fluidly coupled to the valve.

According to some aspects of the present disclosure, a vehicle cover for protecting a vehicle comprises a top structure, a plurality of sidewalls, a plurality of support columns, a valve, and a vent. The plurality of sidewalls is coupled to the top structure. The top structure and the plurality of sidewalls define an interior space that is sized to receive the vehicle The plurality of sidewalls includes a first sidewall, a second sidewall, a third sidewall, and a fourth sidewall. The first sidewall is configured to be positioned adjacent to a driver's side of the vehicle when the vehicle is positioned in the interior space. The first sidewall has a door flap movable between an open position and a closed position. The door flap allows access to a driver's side door of the vehicle when in the open position and the vehicle is positioned in the interior space. The second sidewall is configured to be positioned adjacent to a passenger's side of the vehicle when the vehicle is positioned in the interior space. The third sidewall is configured to be positioned adjacent to a rear side of the vehicle when the vehicle is positioned in the interior space. The fourth sidewall is pivotally coupled to the first sidewall or the second sidewall and movable between an open position and a closed position. The third sidewall when in the open position allows for the vehicle to pass between the first sidewall and the second sidewall. The fourth sidewall is configured to be positioned adjacent to a front side of the vehicle when the vehicle is positioned in the interior space. The first sidewall, the second sidewall, or both include at least one tire flap movable between an open position and a closed position. The at least one tire flap allows access to at least one tire of the vehicle when in the open position and the vehicle is positioned in the interior space. The plurality of support columns is coupled to the plurality of sidewalls. At least one of the plurality of support columns is coupled to each of the plurality of sidewalls such that the plurality of support columns are configured to hold the plurality of sidewalls above a surface on which the vehicle is positioned. The valve is positioned adjacent to at least one of the top structure and the plurality of sidewalls. The vent is formed in the top structure and is configured to prevent water from entering the interior space and allow moisture to escape from the interior space. The top structure and the plurality of sidewalls are each formed from a plurality of inflatable tubes. Each of the inflatable tubes is fluidly coupled to the valve.

According to aspects of the present disclosure, a vehicle cover for protecting a vehicle comprises a series of connected inflatable tubes defining a top and side walls for enclosing the top, front, rear and sides around a vehicle; a plurality of support columns carried in pockets disposed within said inflatable tubes, wherein said support columns raise said side walls above the ground surface to create a gap between a bottom of the side walls and the ground surface; an annular space defined between an interior surface of said inflatable tubes and the top and sides of the vehicle dispose within said walls; a rear panel flap pivotally carried one of said side walls for opening to allow the vehicle to enter and exit from within the walls; a door flap pivotally carried by the side wall adjacent the driver's side door for providing access to the driver's door to enter and exit the vehicle; a plurality of tire flaps pivotally carried by the side walls on both sides of the vehicle, wherein each of said tire flaps include at least one tire spacer inflatable tube for engaging a tire of the vehicle to maintain said annular space along the sides of said vehicle; and a vent unit disposed in said top wall including a fan for drawing air and moisture out from said annular space around the vehicle.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out aspects of the present disclosure, when taken in connection with the accompanying drawings and the appended claims. Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

The disclosure, and its advantages and drawings, will be better understood from the following description of representative embodiments together with reference to the accompanying drawings. These drawings depict only representative embodiments and are therefore not to be considered as limitations on the scope of the various embodiments or claims.

DETAILED DESCRIPTION

Various embodiments are described with reference to the attached figures, where like reference numerals are used throughout the figures to designate similar or equivalent elements. The figures are not necessarily drawn to scale and are provided merely to illustrate aspects and features of the present disclosure. Numerous specific details, relationships, and methods are set forth to provide a full understanding of certain aspects and features of the present disclosure, although one having ordinary skill in the relevant art will recognize that these aspects and features can be practiced without one or more of the specific details, with other relationships, or with other methods. In some instances, well-known structures or operations are not shown in detail for illustrative purposes. The various embodiments disclosed herein are not necessarily limited by the illustrated ordering of acts or events, as some acts may occur in different orders and/or concurrently with other acts or events. Furthermore, not all illustrated acts or events are necessarily required to implement certain aspects and features of the present disclosure. Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are herein described.

For purposes of the present detailed description, unless specifically disclaimed, and where appropriate, the singular includes the plural and vice versa. The word "including" means "including without limitation." Moreover, words of approximation, such as "about," "almost," "substantially," "approximately," and the like, can be used herein to mean "at," "near," "nearly at," "within 3-5% of," "within acceptable manufacturing tolerances of," or any logical combination thereof. Similarly, terms "vertical" or "horizontal" are intended to additionally include "within 3-5% of" a vertical or horizontal orientation, respectively. Additionally, words of direction, such as "top," "bottom," "left," "right," "above," and "below" are intended to relate to the equivalent direction as depicted in a reference illustration; as understood contextually from the object(s) or element(s) being referenced, such as from a commonly used position for the object(s) or element(s); or as otherwise described herein.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

Figure 1:
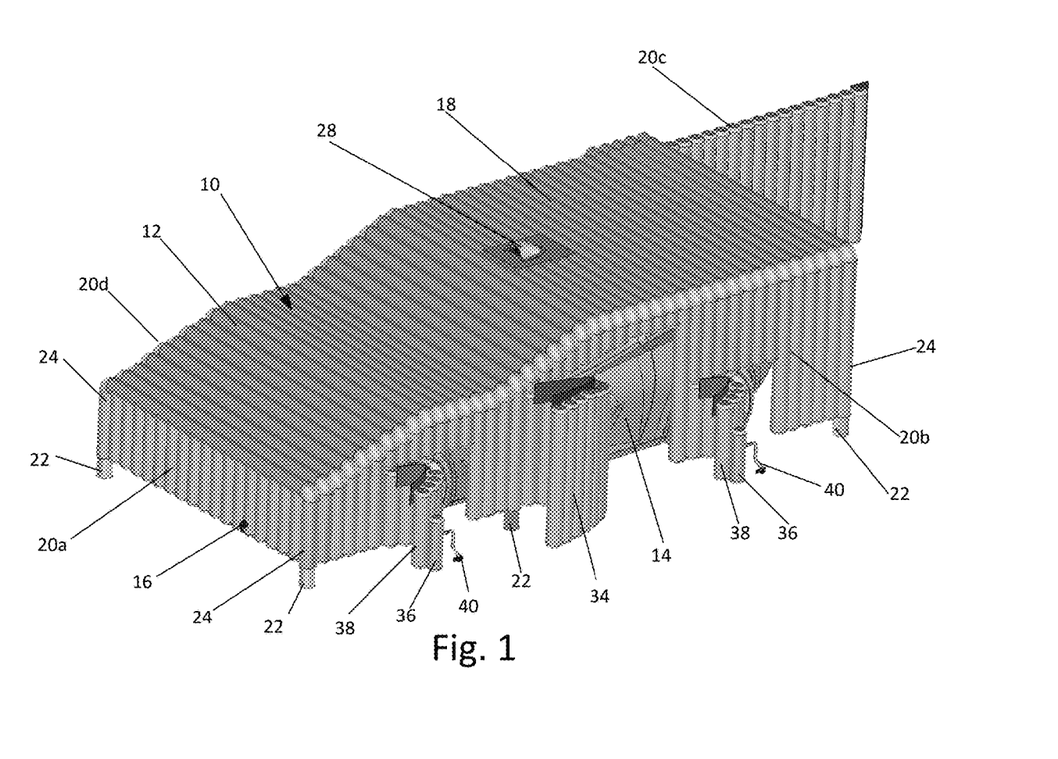
FIG. 1 shows a front perspective view of an inflatable vehicle cover, according to aspects of the present disclosure.
Figure 2:
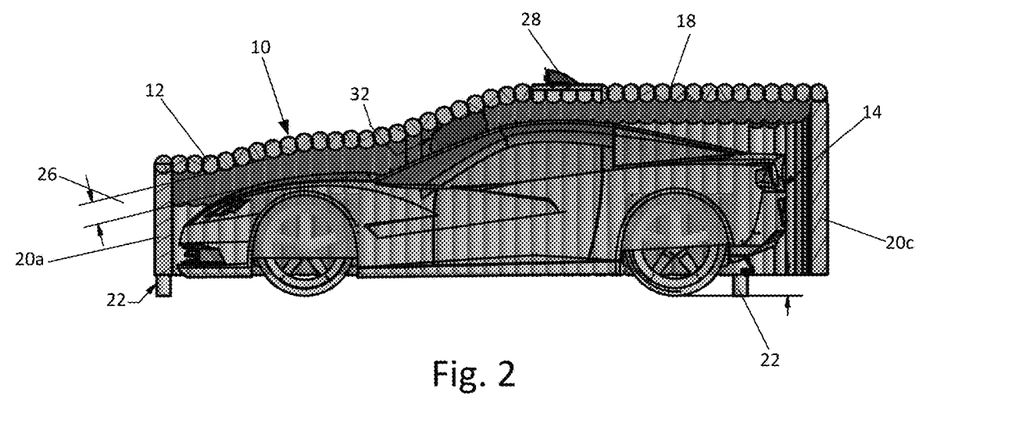
FIG. 2 shows a side cut-away view of the inflatable vehicle cover of FIG. 1, according to aspects of the present disclosure.

Referring to FIG. 1 and FIG. 2, an embodiment of an inflatable vehicle cover 10 is shown according to aspects of the present disclosure. Aspects of the present disclosure address the problems of car covers protecting the surfaces of motor vehicles. In particular, the inflatable vehicle cover 10 shown and described herein includes a plurality of inflatable tubes 12 configured and shaped to fit closely over the top and around the vertical sides of a vehicle 14 (shown in FIG. 2) without touching it. As shown in FIGS. 1 and 2, the inflatable tubes 12 can have a generally vertical orientation (e.g., the inflatable tubes 12 positioned adjacent to the front surface of the vehicle, the back surface of the vehicle, and/or the side surfaces of the vehicle) or a generally horizontal orientation (e.g., the inflatable tubes 12 positioned adjacent to the top surface of the vehicle 14). In some embodiments, some of the inflatable tubes 12 may have an angled orientation that is between the generally vertical orientation and the generally horizontal orientation.

The inflatable vehicle cover 10 can be formed from multiple sheets of a polymer material joined together via welding or melting or adhesive to form the series of interconnected inflatable tubes 12. The inflatable tubes 12 are configured to form a five-sided structure to protect the top and vertical side external surfaces of a vehicle 14. The nature of the joining of the polymer sheets is such that they are permanently connected and allow for airflow at least between each of the tubes 12 and a valve 16 (shown in FIG. 7) that may be located in or adjacent to one or more of the tubes 12, to enable the tubes 12 to be inflated and deflated, and thereby to inflate and deflate the entire cover 10. The valve 16 can be formed into and/or joined to one of the tubes 12 or multiple tubes 12.

The tubes 12 and the valve 16 can be fluidly coupled in a variety of ways. In some embodiments, each tube 12 is fluidly coupled directly to the valve 16 (e.g., there is a fluid path from each tube 12 to the valve 16 that is not shared with any other tube 12). In these embodiments, if one of the tubes 12 is punctured or otherwise damaged, the other tubes 12 will remain inflated. In some embodiments, at least some of the tubes 12 are indirectly fluidly coupled to the valve 16 (e.g., fluidly coupled through another component). In these embodiments, at least some of the tubes 12 are fluidly coupled directly or indirectly to other tubes 12, and at least one tube 12 is fluidly coupled directly to the valve 17. In general, each of the tubes 12 will be fluidly coupled to the valve and/or to one or more other tubes 12. Thus, the vehicle cover 10 is formed from a plurality of distinct inflatable tubes 12 that are physically, interconnected, and the tubes 12 can be fluidly coupled to each other and/or the valve 16 in a variety of different configurations.

In some embodiments, the tubes 12 may be arranged into different groups of tubes 12. For example, as discussed further herein, the cover 10 can be formed from a top structure and one or more sidewalls. Each of the top structure and the sidewalls can be formed from separate groups of tubes. However, in these embodiments, the tubes 12 could be arranged into different groups. Within each respective group, the individual tubes 12 of the respective group could be fluidly coupled to only other tubes 12 in the respective group, and not the tubes 12 of the other groups. Thus, each group of tubes 12 could be separately fluidly coupled to the valve 16.

In some embodiments, the cover 10 may include multiple valves 16. In some of these embodiments, all the tubes 12 can be fluidly coupled (directly or indirectly) to each of the valve 16. This allows for faster inflation and deflation of the tubes 12 if multiple pumps are used. This also allows for redundancy in case one of the valves 16 breaks or is otherwise not functioning properly. In others of these embodiment where the tubes 12 are divided into multiple groups of tubes 12, each of these respective groups of tubes 12 may include its own valve 16. All the tubes 12 within the respective group can be fluidly coupled directly to the valve 16 of the respective group, or indirectly to the valve 16 of the respective group through other tubes 12 of the respective group. For example, if the top cover and each of the one or more sidewalls are each a formed from a separate group of tubes 12, the top cover and each sidewall could include its own valve 16.

Each of the inflatable tubes 12 can have a generally rectangular shape or a generally cylindrical shape (although other shapes are also contemplated), and the tubes 12 are generally parallel to adjacent tubes 12. When the tubes 12 are inflated, the plurality of tubes 12 have sufficient structural rigidity to allow the cover 10 to be self-standing. When the cover 10 is deployed, it will generally be formed from five sides, each formed from the tubes 12. One of the five sides of the cover 10 is a top structure 18 (formed from tubes 12 that are positioned generally horizontally) that is positioned generally horizontal over the top surface of the vehicle 14. The top structure 18 is shaped to conform relatively closely with the top surface of vehicle 14 as best shown in FIG. 2. The inflatable tubes 12 of top structure 18 are configured to run parallel across the width of the vehicle 14 (e.g., between the two sides of the vehicle 14). The other four sides of the cover 10 include vertical sidewalls: vertical sidewall 20a is adjacent to the front of the vehicle 14 (also referred to as the front side of the vehicle 14), vertical sidewall 20b is adjacent to the driver's side of the vehicle 14, vertical sidewall 20c is adjacent to the rear of the vehicle 14 (also referred to as the rear side of the vehicle 14), and vertical sidewall 20d is adjacent to the passenger's side of the vehicle 14. These sidewalls 20a-20d are inflatable walls for the front, rear, and sides of the vehicle. The inflatable tubes 12 on the vertical sides thus are configured to run generally perpendicular to the ground, and generally perpendicular to the tubes 12 of the top structure 18. The four inflatable walls are essentially vertical and connected to the top structure 18 such that when inflated the sidewalls 20a, 20b, 20c and 20d stand vertically and support the top structure 18 above the vehicle 14 and above the ground (or whatever other surface the vehicle 14 may be resting on).

Figure 3:
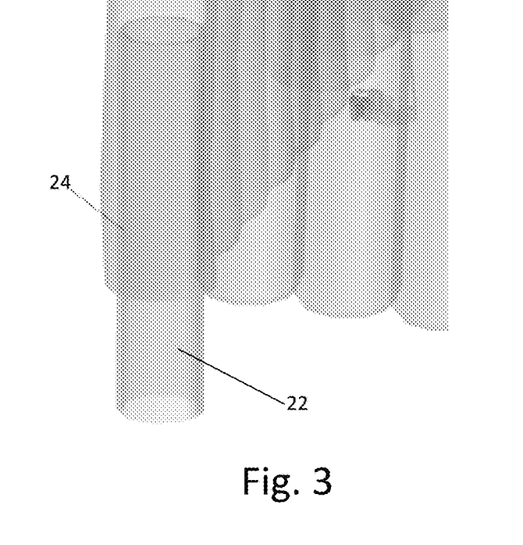
FIG. 3 shows a detailed perspective view of a support column of the inflatable vehicle cover of FIG. 1, according to aspects of the present disclosure.
Figure 4:
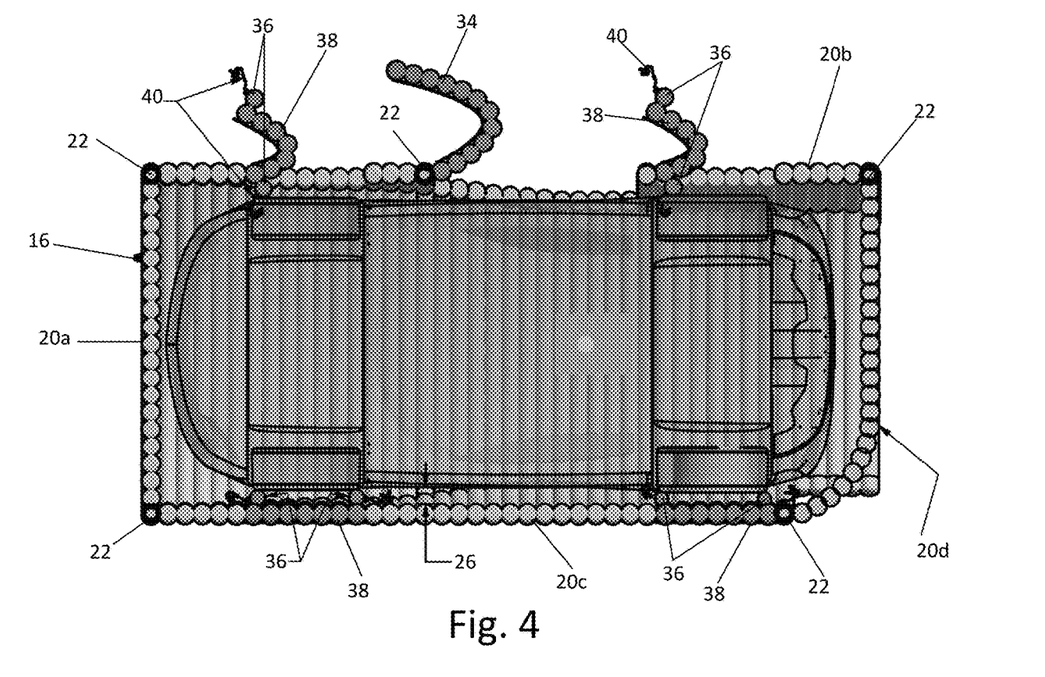
FIG. 4 shows a bottom view of the inflatable vehicle cover of FIG. 1, according to aspects of the present disclosure.

Referring to FIGS. 1, 3 and 4, in some embodiments, the tubes 12 of the cover 10 are dimensioned such that when deployed, the main sidewalls 20a, 20b, 20c and 20d will not touch the ground. The structure is supported from touching the ground by a number of support columns 22. These support columns 22 can be positioned at the corners of the cover 10 (e.g., at the intersection between any two of the sidewalls 20a-20d), and/or along the length of any of the sidewalls 20a-20d. In some embodiments, the inflatable tube 12 where the support column 22 is located will have a pocket 24 integrally formed at the bottom end thereof, which allows the inflatable tube 12 to slide over the support column 22 such that the support column 22 can be received within the pocket 24. In other embodiments, the inflatable tubes 12 can attached to the support columns 22 using any other suitable mechanism (e.g., clips, pins, hook-and-loop fasteners, etc.). In some embodiments, the support columns 22 are formed from standard PVC pipe, and the pockets 24 are sized to accept standard PVC pipe. Generally, the PVC pipe (or other material forming the support columns 22) will have a length that supports the sidewalls 20a-20d above the surface of the ground when the support columns 22 are received within the pockets 24.

Referring to FIG. 2, the dimensions of the overall structure for the cover 10 are such as to provide an interior space 26 around the surfaces (e.g., the painted surface) of the vehicle 14. The interior space 26 will generally have an annular shape, with the vehicle 14 disposed in the center. The boundary of this interior space 26 will generally be formed by the top structure 18 and all the sidewalls 20a-20d. As discussed herein however, the cover 10 has certain features such that at some points during use of the cover 10, the boundary of the interior space 26 will be formed by less than the top structure 18 and all the sidewalls 20a-20d, and/or from portions of the any of the top structure 18 and sidewalls 20a-20d. In some embodiments, the inflatable sidewalls 20a, 20b, 20c and 20d and top structure 18 are planar (e.g., flat). In other embodiments, the inflatable sidewalls 20a, 20b, 20c and 20d and top structure 18 have a curvature to counteract any natural sag that might occur due to the weight of the cover 10, and/or to follow the shape of the vehicle 14. For example, the top structure 18 may curve upward from the front sidewall 20a to the rear sidewall 20c in order to follow the curve of the vehicle 14 from the roof to the hood. In further embodiments, the top structure 18 can be planar while one or more of the sidewalls 20a-20d have some curvature. In additional embodiments, the top structure 18 can have some curvature while one or more of the sidewalls 20a-20d is planar.

Figure 9:
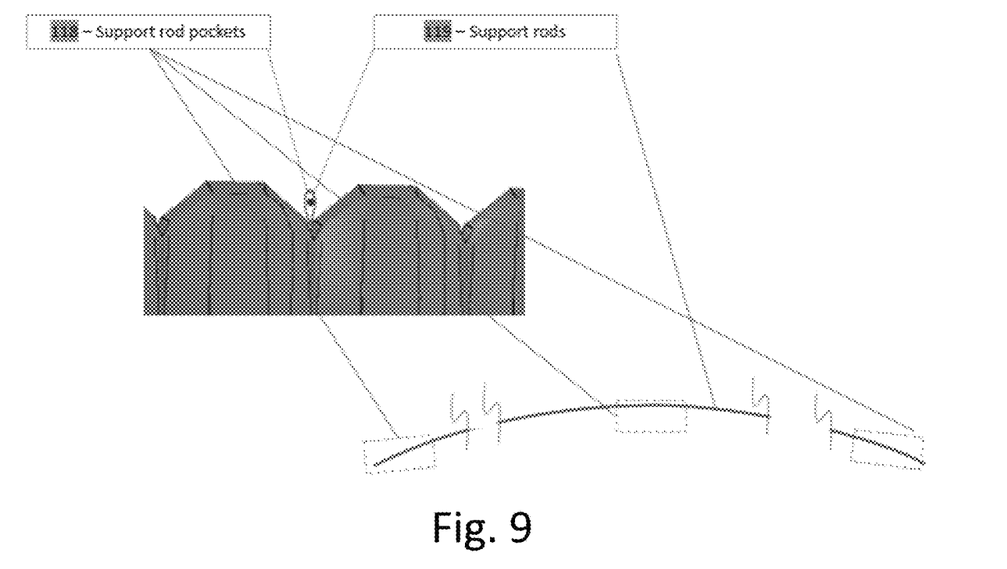
FIG. 9 shows a support rod arrangement for the inflatable vehicle cover of FIG. 1, according to aspects of the present disclosure.

As shown in FIG. 9, in some embodiments the inflatable tubes 12 can have pockets 118 (that may be integrally formed on or in the tubes 12, or formed separately and attached) into which support rods 119 can be inserted. The pockets 118 can generally be located at any point on any of the tubes 12. In some embodiments, the pockets 118 are located at the ends of one or more tubes 12 of one or more of the sidewalls 20a-20d and/or the top structure 18. The support rods 119 can generally extend in any direction relative to the ground. For example, some embodiments include support rods 119 that are perpendicular to the ground and parallel to the tubes 12 of the sidewalls 20a-20d. In some of these embodiments, the ends of a given support rod 119 can be positioned in the pockets 118 of a single tube 12 of one of the sidewalls 20a-20d. In others of these embodiments, one end of a given support rod 119 can be positioned in the pocket 118 of a tube 12 of one of the sidewalls 20a-20d, and the other end of the given support rod 119 can be positioned in the pocket 118 of a tube 12 of the top structure 18. In further embodiments, some support rods 119 are only in pockets 118 of tubes 12 of the sidewalls 20a-20d and other support rods 119 are in a pocket of a tube 12 of one of the sidewalls 20a-20d and a pocket of a tube 12 of the top structure 18. In any of these embodiments, these support rods can aid in supporting the top structure 18.

Some embodiments include support rods 119 that are parallel to the ground. In some of these embodiments, one end of a given support rod 119 can be positioned in the pocket 118 of a tube 12 of one of the sidewalls 20a-20d, and the other end of the given support rod 119 can be positioned in the pocket 118 of a different tube 12 of the same sidewall 20a-20d. In others of these embodiments, the ends of the support rods 119 are positioned in the pockets 118 of one or more of the tubes 12 of the top structure 18. Some of the supports rods 119 can be positioned in pockets 118 of only one tube 12 of the top structure 18 (e.g., the support rods 119 are parallel to the ground and parallel to the tubes 12 of the top structure 18). Some of the support rods 119 can be positioned in pockets 118 of multiple tubes 12 of the top structure 18 (e.g., the support rods 119 are parallel to the ground and perpendicular to the tubes 12 of the top structure 18).

Some embodiments may include support rods 119 extending in multiple different directions, and inserted into pockets 118 in generally any combination. For example, some embodiments can include support rods 119 perpendicular to the ground and inserted into pockets 118 of one or more tubes 12 of the sidewalls 20a-20d (and in some cases into pockets 118 of one or more tubes 12 of the top structure 18), and one or more support rods 119 parallel to the ground and inserted into pockets 118 of one or more tubes 12 of the sidewalls 20a-20d and/or one or more tubes 12 of the top structure 18. In another example, some embodiments can include only support rods 119 that are parallel to the ground, where some of the support rods 119 are inserted into pockets 118 of only tubes 12 of the sidewalls 20a-20d, while other support rods 119 are inserted into pockets 118 of only tubes 12 of the top structure 18.

In any embodiment, the support rods 119 can aid in maintaining the curvature and rigidity of the tubes 12. The support rods 119 can be formed of a flexible material, and will generally have a length that is longer than the distance between the pockets 118 of whichever two tubes 12 form the end of the span of the support rods 119, so that when the support rod 119 is inserted into these two pockets 118, the support rod 119 will bend to fit and have a curved shape, and as a result, cause the top structure 18 and/or any of the sidewalls 20a-20d to have a curved shape (and ultimately to cause at least a portion of the cover 10 to have a curved shape). For example, a support rod 119 that is inserted into pockets 118 of a tube 12 of the top structure, or into pockets 118 of two different tubes 12 of one of the sidewalls 20a-20d on the upper end of that sidewall 20a-20d near the top structure 18, will generally aid in causing the top structure 18 to have a curved shape.

In some embodiments, the inflatable tubes 12 may be formed of a transparent or partially transparent material. In other embodiments the inflatable tubes 12 may be formed from an opaque material. In some embodiments, the inner surface of the cover 10 includes a material that forms a radiant barrier, such as reflective aluminum or an opaque white coating. In some embodiments, the interior surface can be formed from flocked cotton fabric and/or another soft non-paint marring material. In some embodiments, the interior surface of the cover 10 is a white-colored or aluminized fabric surface that aids in minimizing thermal radiance to the vehicle 14.

Figure 6:
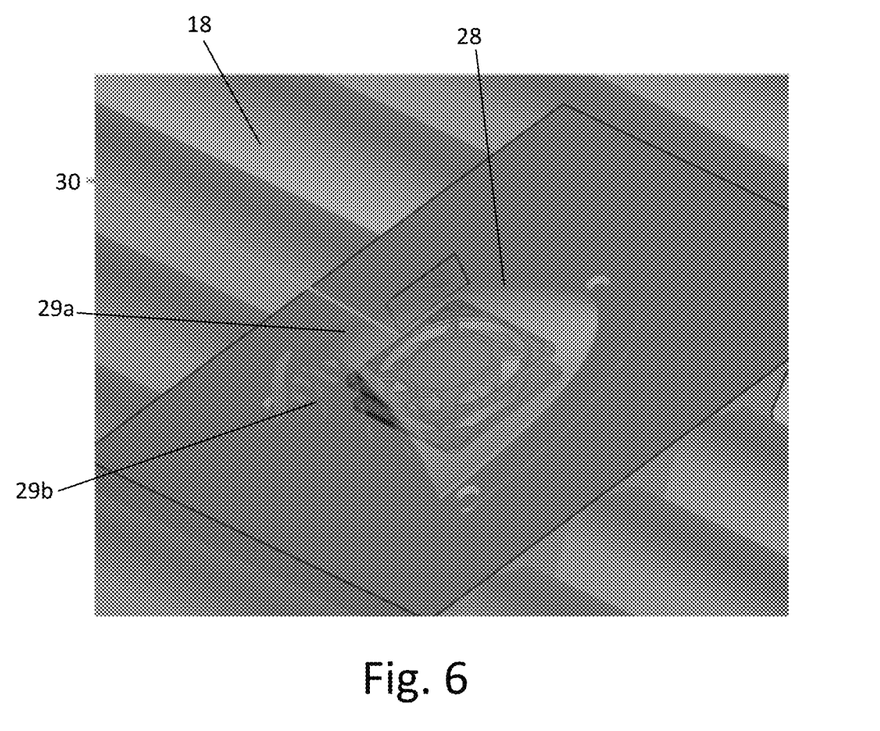
FIG. 6 shows a perspective view of a vent and a fan unit of the inflatable vehicle cover of FIG. 1, according to aspects of the present disclosure.

Referring to FIG. 1 and FIG. 6, in some embodiments, the top structure 18 includes a vent 28 that prevents water (such as rain fall) from entering the interior space 26 between the interior of the cover 10 and the vehicle 14, but allows air and moisture to escape from the interior space 26. In the illustrated embodiment, the vent 28 is formed from a hood 29a (FIG. 6) and a grid 29b. The hood 29a includes a curved edge and slopes downward on one side of the curved edge. The grid 29b is positioned on the other side of the curved edge and generally forms a flat face. The grid 29b definiens a plurality of openings to allow the passage of gases including water vapor. The hood 29a and/or the grid 29b can be made of a rigid impermeable material. In other embodiments however, the vent 28 can have different shapes and/or configurations. For example, the grid 29b could be positioned within the hood 29a, and the flat face could be solid.

The vent 28 can be integrally fastened or molded to the surfaces of the inflatable tubes 12 and located over an opening defined in inflatable tubes 12 of the top structure 18 to allow circulation of gases through the grid 29b. In some embodiments, the vent 28 contains a circulation fan 30 positioned underneath the hood 29a that can be operated to draw air and moisture vapor out from underneath the cover 10. The fan 30 may be operatively associated with a solar power source, a battery power source, a power cord attached to an outlet or other electrical power source, or any other suitable means.

Referring to FIG. 2, a further feature of the top structure 18 is a series of spacer tubes 32 positioned between the inner surface of the top structure 18 and the vehicle 15. The spacer tubes 32 are sized and positioned so that they only touch the windshield when the vehicle 14 and cover 10 are in the correct position relative to one another. The spacer tubes 32 aid in supporting the top structure 18 of the cover 10. While the spacers tubes 32 are formed like the inflatable tubes 12 of the cover 10, these spacers may generally have any desired size and/or shape.

Figure 5:
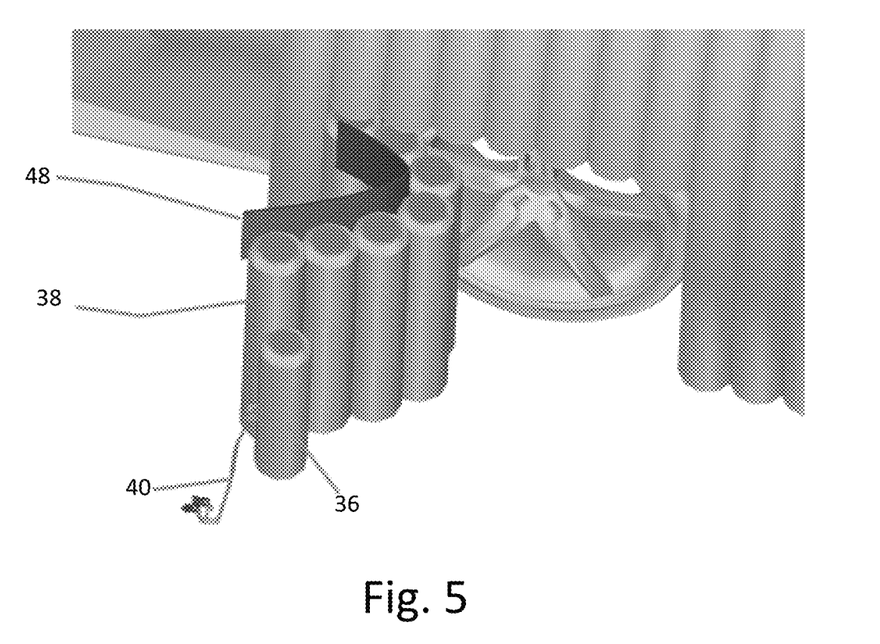
FIG. 5 shows a detailed perspective view of a tire flap of the inflatable vehicle cover of FIG. 1 in an open position, according to aspects of the present disclosure.

Referring to FIGS. 1, 4 and 5, portions of the inflatable sidewalls 20a, 20b, 20c may include and/or being formed as or from one or more movable flaps (formed from some of the tubes 12) to allow the vehicle 14 to be removed from the cover 10 without deflating the cover 10. In some embodiments, the sidewall 20b positioned on the driver's side of the vehicle 14 has a single large movable door flap 34 that shaped like the driver's door. The door flap 34 is pivotally coupled to sidewall 20b, and pivots and/or folds between an open position and a closed position. When the door flap 34 is in the open position, a gap is defined in the sidewall 20b. Thus, when the door flap 34 is in the open position, only a portion of the sidewall 20b will form the boundary of the interior space 26 due to the presence of the gap in the sidewall 20b, and the door flap 34 does not form any part of the boundary of the interior space 26. When the door flap 34 is in the closed position, the entirety of the sidewall 20b (e.g., including the door flap 34) forms part of the boundary of the interior space 26.

This gap is designed to be generally the same size as the driver's side door of the vehicle 14 and will be aligned with the driver's side door when the vehicle 14 is located within the interior space 26 of the cover 10. Thus, when the vehicle 14 is in the interior space 26 and the door flap 34 is in the open position (shown in FIGS. 1 and 4), a person can open the driver's side door and enter and/or exit the vehicle 14 through the driver's side door. When the door flap 34 is in the closed position, no gap is defined in the sidewall 20b, such that the door flap 34 forms part of the boundary of the interior space 26. In other embodiments, the driver opening is comprised of two separate movable door flaps that are each pivotally coupled to the sidewall 20b, as opposed to a single door flap 34 as illustrated. While not shown, the sidewall 20d will generally have a similar door flap that is pivotally formed in the sidewall 20d and can pivot between an open position and closed position. When in the open position, a gap is defined in the sidewall 20d such that only a portion of the sidewall 20d forms the boundary of the interior space 26, and such that the passenger's side door of the vehicle 14 is accessible. When in the closed position, the entirety of the sidewall 20d (e.g., including the door flap formed in the sidewall 20d) forms part of the boundary of the interior space 26. This door flap will be aligned with the passenger's side door when the vehicle 14 is located within the interior space 26 of the cover 10, such that when the vehicle 14 is in the interior space 26 and the door flap 34 is in the open position, a person is able to open the passenger's side door and enter and/or exit the vehicle 14 through the passenger's side door.

Referring to FIGS. 1, 4 and 5, a further feature of the sidewalls 20b and 20d are a series of inflatable tire spacer tubes 36 located on the inner surface of both sidewalls 20b and 20d that are sized and positioned so that they only touch the tire surfaces when the vehicle 14 and cover 10 are in the correct position relative to one another. The tire spacer tubes 36 engage the tire surfaces of the vehicle 14 to maintain the space 26 between the vehicle 14 and the cover 10. The tire spacer tubes 36 are located on movable tire flaps 38 that are aligned with the tires of the vehicle 14 when the vehicle 14 is located within the interior space 26. The movable tire flaps 38 are pivotally formed in and/or coupled to the sidewalls 20b and 20d, and can pivot to an open position to allow access to the tires. Like the door flap 34, when the tire flaps 38 are in the open position, a gap is defined in the sidewall 20b and/or 20d, such that the tires of the vehicle 14 can be accessed. When the tire flaps 38 are in the closed position, no gap is formed. Thus, when any of the tire flaps 38 are in their open position, only a portion of the sidewall 20b and/or the sidewall 20d will form the boundary of the interior space 26 due to the presence of the gaps in the sidewall 20b and/or the sidewall 20d, and the tire flaps 38 do not form any portion of the boundary of the interior space 26. When any of the tire flaps 38 are in the closed position, the entirety of the sidewall 20b and/or the sidewall 20d (e.g., including the tire flaps 38) forms part of the boundary of the interior space 26.

A further feature of the sidewalls is a set of straps 40 coupled to the sidewalls 20b and 20d to allow fastening of the cover 10 to the vehicle 14 (e.g., the wheels of the vehicle 14) to aid in preventing movement of the cover 10 relative to the vehicle 14. The straps 40 could be secured to the vehicle 14 in generally any manner. For example, in some embodiments, the straps may include a hook, a clip, a hook-and-loop fastener, etc. that is able to be secured to a portion the vehicle 14, such as the wheels. In some implementations, the straps 40 can loop around portions of the vehicle 14 and then be secured to themselves or any portion of the cover 10. For example, the end of a strap 40 could be looped through and/or around a wheel of the vehicle 14, and then that end could attached to the strap 40 or another portion of the cover 10, for example using a hook, clip, a hook-and-loop fastener, etc. In the illustrated embodiment, straps 40 are coupled to the tire flaps 38 so that the straps 40 will move out of the way when the tire flaps 38 are moved to the open position (shown in FIGS. 1, 5, and 5), to allow the vehicle 14 to enter or exit the cover. However, the straps 40 could generally be coupled to any portion of the cover 10. In some implementations, the cover 10 may include straps 40 that are positioned on the exterior of the cover 10 and configured to attached to a separate mounting point outside of the cover 10, such as a wall, a pole, etc.

Figure 8:
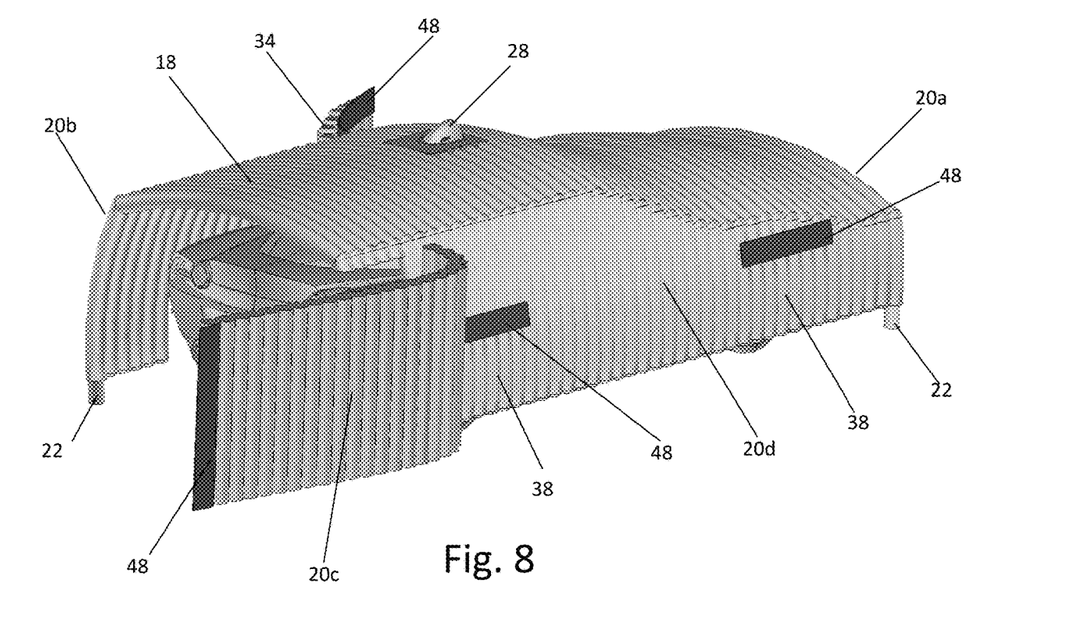
FIG. 8 shows a rear perspective view of the inflatable vehicle cover of FIG. 1, according to aspects of the present disclosure.

As best shown in FIG. 1 and FIG. 8, the inflatable sidewall 20c positioned at the rear of the vehicle 14 can be formed as a single large movable panel or flap that folds or pivots out of the way to allow the vehicle 14 to enter and exit the cover 10. The sidewall 20c can be pivotally coupled to the sidewall 20b or the sidewall 20c to allow the sidewall 20c to pivot between an open position and a closed position. In the open position (shown in FIGS. 1 and 8), the sidewall 20c extends from one of the sidewalls 20b, 20c and away from the other of the sidewalls 20b, 20c, such that a gap is formed between the sidewall 20b and the sidewall 20d. This gap is generally large enough so that the vehicle 14 can pass therethrough into and out of the interior space 26. Thus, the vehicle 14 can be driven into and out of the cover 10 without deflating or disassembling the cover 10. When the sidewall 20c is in the closed position (shown in FIGS. 2, 4, and 8), the sidewall 20c extends between the sidewall 20b and the sidewall 20d such that no gap is formed between them. The sidewall 20c in the closed position can thus bridge the gap between the sidewall 20b and the sidewall 20d such that the vehicle 14 can be driven into or out of the interior space 26 when the sidewall 20c is in the closed position.

In some embodiments, the sidewall 20c is formed so that the entire sidewall 20c is pivotally coupled to the sidewall 20b or the sidewall 20d. In these embodiments, when the sidewall 20c is in the closed position, the sidewall 20c forms a portion of the boundary of the interior space 26, and when the sidewall 20c is in the open position, the sidewall 20c does not form any portion of the boundary of the interior space 26. However, in some embodiments, the entire sidewall 20c is not pivotally attached to the sidewall 20b or the sidewall 20d. Instead, a separate rear flap is pivotally attached the sidewall 20c. When the rear flap is in the open position, a gap is still formed between the sidewall 20b and the sidewall 20d, but the width of this gap is less than the full width of the sidewall 20c between the sidewall 20b and the sidewall There will still be some portion of the sidewall 20c that remains in place and extends generally perpendicular to the sidewall 20b and the sidewall 20d. In these embodiments, when the rear flap is in the open position, a portion of the sidewall 20c will still form part of the boundary of the interior space 26 and the rear flap will not form any part of the boundary of the interior space 26. When the rear flap is in the closed position, the entirety of the sidewall 20c (e.g., including the rear flap) will form part of the boundary of the interior space 26.

Referring to FIG. 8, the movable tire flaps 38, the door flap 34, and the rear sidewall can be integrally formed with the cover 10 along one parallel side and secured to adjacent tubes 12 of the cover 10 along at least one other generally perpendicular side using flap fasteners 48. Flap fasteners 48 may be formed of a hook-and-loop fastener (such as Velcro®), zippers, or other similar fastening means that allow the flap fasteners 48 to be releasably connected to the adjacent tubes 12. Further, the flap fasteners 48 can hold the tire flaps 38, the door flaps 34, and the rear sidewall 20c in their respective open positions by connecting back on themselves when the vehicle 14 is moved into or out of the cover 10.

Figure 7:
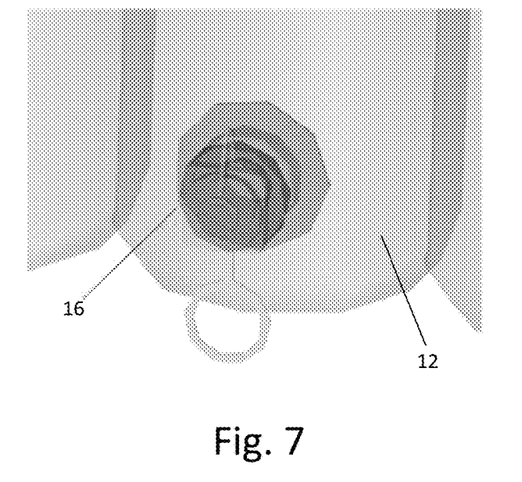
FIG. 7 shows a detailed perspective view of a valve for inflating and deflating the inflatable vehicle cover of FIG. 1, according to aspects of the present disclosure.

FIG. 7 illustrates the valve 16 that can be formed in the top structure 18 and/or any of the sidewalls 20a-20d. In the illustrated embodiment the valve 16 is a Boston valve, which acts as a check valve for inflation (e.g., the valve allows air to be forced into the tubes 12 through the air but automatically closes to prevent air from leaking out of the tubes 12), but acts as an opening for deflation (e.g., the valve allows air to freely flow out of the tubes 12 to deflate them). However, the valve 16 may be implemented as other types of valves. The valve 16 is sized to allow easy connection to household devices such as leaf blowers, shop vacuums, or other typical blower devices that can be used for inflating the cover. In some embodiments, the cover 10 is configured with an integral inflation fan. The integral inflation fan can be coupled to or formed on or in any one or more of the tubes 12, and is generally configured to cause air to flow into the tubes 12. The integral inflation fan can have an external power connector (e.g., an electrical plug) that can be connected to a power source (e.g., an electrical outlet). In some embodiments, the integral inflation fan is formed with the valve 16. The integral inflation fan can constantly blow air into the cover 10 when connected to a power source, maintaining the inflation of the cover 10 during use. The integral inflation could also blow air into the cover 10 on a pre-defined schedule when connected to a power source. For example, the integral inflation fan could activate periodically after the cover 10 has been initially inflated to maintain the inflation of the cover 10 during use. In another example, after the cover 10 is initially inflated and the integral inflation fan is deactivated, the integral inflation can could be re-activated if it is determined that the cover 10 has suffered some amount of deflation. In these examples, the integral inflation fan may be communicably coupled to a controller and one or more sensors (such as pressure sensors). When data generated by the sensors indicates that the cover 10 has suffered from a threshold amount of deflation, the cover 10 can cause the integral inflation fan to re-activate and re-inflate the cover 10. The integral inflation fan could also be manually activated and deactivated whenever needed, for example via operation of a user-accessible switch.

The vehicle 14 can be removed from the cover 10 without deflating the tubes 12 by opening the rear sidewall 20c, opening the tire flaps 38, opening the driver's door flap 34, and then after the driver enters the vehicle 14, reversing the vehicle 14 out of the cover 10. The process is reversed for storing the vehicle 14 in the cover 10.

Figure 10:
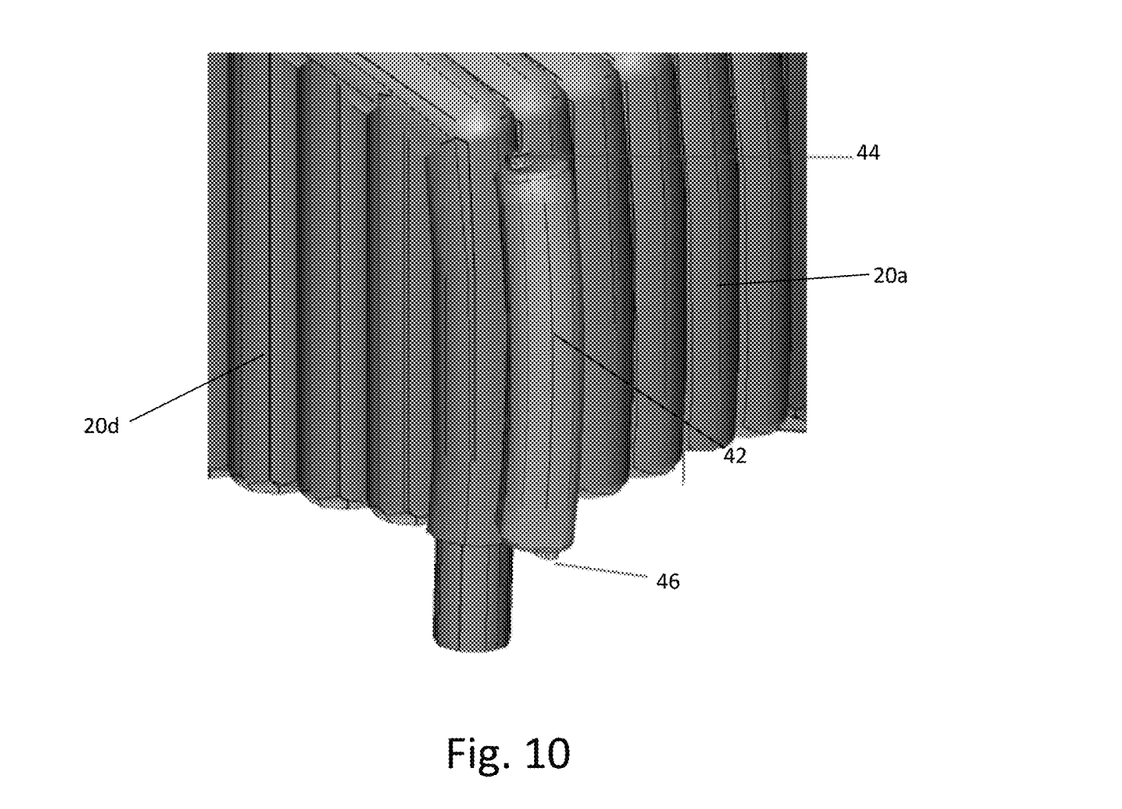
FIG. 10 shows a detailed perspective view of a weight pocket of the inflatable vehicle cover of FIG. 1, according to aspects of the present disclosure.

Referring to FIG. 10, a further feature of the inflatable sidewalls 20a-20d is a series of pockets 42 on the outside of the cover 10 that can be filed with material (such as water, sand, rocks, dirt, etc.) to weight down the cover 10 and aid in maintaining the cover 10 in position when the vehicle 14 is not inside the cover 10. The pockets 42 can be integrally formed with the tubes 12 or can be separately formed and then attached to the tubes 12. The pockets 42 can include an upper port 44 through which the material can be deposited into the pockets 42, and a lower port 46 through which the material can be removed out of the pockets 42. In some embodiments, material can additionally or alternatively be deposited into the pockets 42 via the lower ports 46. In some embodiments, material can additionally or alternatively be removed out of the pockets 42 via the upper ports 44. In some embodiment, the upper ports 44 and/or the lower ports 46 can be standard fittings that allow a hose to be screwed onto the ports 44 and/or the ports 46, which allow the pockets 42 to be easily filled with water.

In some embodiments, the vehicle cover provides for the insertion and removal of the vehicle without deflating the inflatable tubes forming the vehicle cover. In some embodiments, the inflatable vehicle cover creates a gap between the vehicle body and the interior surface of the cover to avoid trapping moisture and debris against the vehicle while also keeping the cover off the ground. In some embodiments, the vehicle cover provides easy access to the vehicle without having to remove or deflate the cover. In some embodiments, the vehicle cover includes an arrangement of vents and fans for expelling moisture from underneath the cover.

In general, a vehicle cover according to aspects of the present disclosure can include any number of features or components discussed herein. For example, some embodiments of the vehicle cover may include less than all four sidewalls. Other embodiments of the vehicle cover do not include the top structure.

The cover 10 can be sized to fit any suitable vehicle or structure. For example, the cover 10 can be sized to fit typical passenger vehicles of generally any size, including cars, vans, SUVs, trucks, etc. The cover 10 can also be sized to fit other vehicles such as semi-trailer trucks (the truck cab, the trailer, or both), RVs, motorhomes, camper vans, towable campers (such as popup campers, travel trailers, fifth-wheel campers, etc.), boats, boat trailers, personal watercrafts (e.g., jet skis), trailers for personal watercrafts, bikes, scooters, lawnmowers, etc. The various flaps can thus be sized to accommodate any vehicle. The rear flap can have a width up to around 15 feet, but more typically between about 5 feet and about 10 feet. The tire flaps can have a width as needed to provide access to the tires, such as between about 15 inches about 30 inches. The door flaps can have a width as needed to provide access to the doors, such as between about 2 feet and about 6 feet.

One or more elements or aspects or steps, or any portion(s) thereof, from one or more of any of claims can be combined with one or more elements or aspects or steps, or any portion(s) thereof, from one or more of any of the other claims or combinations thereof, to form one or more additional implementations and/or claims of the present disclosure.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

While the present disclosure has been described with reference to one or more particular embodiments, those skilled in the art will recognize that many changes may be made thereto without departing from the spirit and scope of the present disclosure. Each of these implementations and obvious variations thereof is contemplated as falling within the spirit and scope of the present disclosure. It is also contemplated that additional implementations according to aspects of the present disclosure may combine any number of features from any of the implementations described herein.

What is claimed is:

1. A vehicle cover for protecting a vehicle, the vehicle cover comprising:
    a top structure configured to be positioned above a top of the vehicle;
    one or more sidewalls coupled to the top structure, each of the one or more sidewalls being configured to be positioned adjacent to a side of the vehicle; and
    one or more support columns coupled to an end of the one or more sidewalls, the end of the one or more sidewalls being opposite from the top structure, the one or more support columns configured to support the one or more sidewalls above a surface upon which the vehicle rests without contacting the vehicle,
    wherein the top structure and the one or more sidewalls define an interior space that is sized to receive the vehicle,
    wherein the top structure and the one or more sidewalls are each formed from a plurality of inflatable tubes,
    wherein the one or more sidewalls are configured to support the top structure such that when the vehicle is positioned in the interior space, none of the inflatable tubes forming the top structure contact any painted portion of the vehicle, and
    wherein at least one inflatable tube of each of the one or more sidewalls includes a pocket defined at an end of the at least one inflatable tube opposite from the top structure, the pocket of the inflatable tube of each of the one or more sidewalls being sized to receive a respective one of the one or more support columns therein such that at least a portion of the inflatable tube of each respective sidewall slides over and surrounds at least a portion of the respective support column and the respective support column extends from the inflatable tube opposite the top structure.

2. The vehicle cover of claim 1, wherein at least one of the plurality of inflatable tubes is fluidly coupled to at least one other inflatable tube of the plurality of inflatable tubes.

3. The vehicle cover of claim 1, wherein the one or more sidewalls include a first sidewall configured to be positioned adjacent to a first side of the vehicle and a second sidewall configured to be positioned adjacent to a second side of the vehicle.

4. The vehicle cover of claim 3, wherein the first sidewall is generally parallel to the second sidewall or generally perpendicular to the second sidewall.

5. The vehicle cover of claim 4, wherein the one or more sidewalls further include a third sidewall configured to be positioned adjacent to a third side of the vehicle and a fourth sidewall configured to be positioned adjacent to a fourth side of the vehicle.

6. The vehicle cover of claim 5, wherein the first sidewall is configured to be positioned adjacent to a driver's side of the vehicle, the second sidewall is configured to be positioned adjacent to a passenger's side of the vehicle, the third sidewall is configured to be positioned adjacent to a front side of the vehicle, and the fourth sidewall is configured to be positioned adjacent to a rear side of the vehicle.

7. The vehicle cover of claim 1, wherein the one or more sidewalls include a first sidewall configured to be positioned adjacent to a driver's side of the vehicle, a second sidewall configured to be positioned adjacent to a passenger's side of the vehicle, and a third sidewall pivotally coupled to the first sidewall or the second sidewall, the third sidewall being configured to pivot between an open position and a closed position.

8. The vehicle cover of claim 7, wherein when the third sidewall is in the closed position, the third sidewall extends between the first sidewall and the second sidewall such that the third sidewall forms at least a portion of a boundary of the interior space, and wherein when the third sidewall is in the open position, the third sidewall extends from the first sidewall away from the second sidewall such that a gap is formed between the first sidewall and the second sidewall, the third sidewall being sized such that when the third sidewall is in the open position, the gap is large enough to allow the vehicle to enter into and exit from the interior space without contacting the first sidewall or the second sidewall.

9. The vehicle cover of claim 1, wherein the one or more sidewalls includes a first sidewall having a first door flap pivotally formed therein, the first door flap being movable between an open position and a closed position, wherein when the first door flap is in the closed position the first door flap forms at least a portion of a boundary of the interior space, and wherein when the first door flap is in the open position, a gap is defined in the first sidewall such that the first door flap does not form a portion of the boundary of the interior space.

10. The vehicle cover of claim 1, wherein at least one of the one or more sidewalls includes a tire flap pivotally formed in the at least one of the one or more sidewalls, the tire flap being movable between a closed position and an open position, wherein when the tire flap is in the closed position the tire flap forms at least a portion of a boundary of the interior space, and wherein when the tire flap is in the open position, a gap is defined in the at least one of the one or more sidewalls such that the tire flap does not form a portion of the boundary of the interior space, and wherein the vehicle cover further comprises a spacer coupled to an interior of the tire flap and configured to contact a tire of the vehicle when the vehicle is positioned in the interior space and the tire flap is in the closed position such that the tire flap does not contact the wheel or any painted surface on a side of the vehicle.

11. The vehicle cover of claim 1, wherein the top structure includes a vent configured to prevent water from entering the interior space and to allow moisture to escape from the interior space, and a fan operable to cause moisture to escape from the interior space through the vent.

12. The vehicle cover of claim 1, further comprising one or more straps coupled to the top structure, one or more of the sidewalls, or both, the one or more straps being configured to be attached to the vehicle when the vehicle is positioned in the interior space.

13. The vehicle cover of claim 1, further comprising one or more pockets formed on at least one of the one or more sidewalls, the one or more pockets being configured to receive material therein to aid in weighing down the vehicle cover.

14. The vehicle cover of claim 1, further comprising at least one support rod coupled to the top structure, at least one of the one or more sidewalls, or both, the at least one support rod having a curved shape to cause the vehicle cover to have a curved shape.

15. The vehicle cover of claim 1, further comprising one or more spacers coupled to an interior surface of the top structure the one or more spacers configured to contact only a windshield of the vehicle when the vehicle is positioned in the interior space such that no portion of the top structure contacts a painted surface of the vehicle.

16. The vehicle cover of claim 1, further comprising an inflation fan coupled to the top structure or one of the one or more sidewalls, the inflation fan being operable to cause air to flow into the plurality of inflatable tubes.

17. The vehicle cover of claim 1, further comprising a plurality of spacers coupled to an interior surface of the top structure and an interior surface of the one or more sidewalls, the plurality of spacers being positioned to contact only unpainted surfaces of the vehicle when the vehicle is positioned in the interior space such that none of the inflatable tubes forming the top structure and the one or more sidewalls contact any painted surface of the vehicle.

18. The vehicle cover of claim 17, wherein the plurality of spacers are disengageable from the vehicle to allow the vehicle to be removed from the interior space without moving or re-positioning the inflatable tubes of the top structure and the one or more sidewalls.

19. A vehicle cover for protecting a vehicle, the vehicle cover comprising:
    a top structure configured to be positioned above a top of the vehicle;
    one or more sidewalls coupled to the top structure, each of the one or more sidewalls being configured to be positioned adjacent to a side of the vehicle; and
    a plurality of spacers coupled to an interior surface of the top structure and an interior surface of the one or more sidewalls,
    wherein the top structure and the one or more sidewalls are each formed from a plurality of inflatable tubes and define an interior space that is sized to receive the vehicle, the one or more sidewalls supporting the top structure such that when the vehicle is positioned in the interior space, none of the inflatable tubes forming the top structure contact any painted surface of the vehicle,
    wherein the plurality of spacers are positioned to contact only unpainted surfaces of the vehicle when the vehicle is positioned in the interior space to aid in preventing the inflatable tubes forming the top structure and the one or more sidewalls from contacting any painted surface of the vehicle, the plurality of spacers are disengageable from the vehicle to allow the vehicle to be removed from the interior space without moving or re-positioning the inflatable tubes of the top structure and the one or more sidewalls.

20. The vehicle cover of claim 19, wherein each of the plurality of spacers is inflatable.

* * * * *